United States Patent [19]

Anschutz

[11] 3,928,184
[45] Dec. 23, 1975

[54] EGG HANDLING APPARATUS

[76] Inventor: Wayne H. Anschutz, 309 East 47th, Topeka, Kans.

[22] Filed: Sept. 19, 1973

[21] Appl. No.: 398,636

[52] U.S. Cl.............. 209/74 R; 209/121; 177/211
[51] Int. Cl............................................. B07c 5/28
[58] Field of Search......... 209/73, 74 R, 74 M, 121; 177/210, 211

[56] References Cited
UNITED STATES PATENTS

| | | | |
|---|---|---|---|
| 2,235,725 | 3/1941 | Nordquist | 209/121 |
| 2,308,729 | 1/1943 | Walter | 209/121 |
| 2,720,111 | 10/1955 | Clark | 177/211 X |
| 2,843,250 | 7/1958 | Niederer | 209/121 X |
| 3,511,367 | 5/1970 | Bliss | 209/73 |
| 3,640,384 | 2/1972 | Del Rosso | 209/74 M |

*Primary Examiner*—Allen N. Knowles
*Attorney, Agent, or Firm*—Guy A. Greenwalt

[57] ABSTRACT

A machine for grading eggs according to their weight and delivering the eggs to a series of packing machines for packaging in cartons, or the like, which is characterized by an elongate main support frame on which there is mounted a pocketed single line traveling conveyor, a means at one end of the main frame for delivering successive rows of eggs to strain gauge weighing devices from which the eggs are transferred to the pockets of the single line conveyor for travel to a series of discharge areas spaced along the main frame where the eggs are discharged onto feeding means for packing machines which are mounted at said discharge areas. The weighing devices are electrically connected to a memory device which triggers mechanism for effecting the discharge of each egg at the proper discharge area according to the weight as determined by the weighing device to which the egg has been initially delivered. The individual eggs are discharged from the single line conveyor and delivered to the proper packing machine by special air jet transfer devices which are actuated at the proper discharge area by the memory device.

31 Claims, 19 Drawing Figures

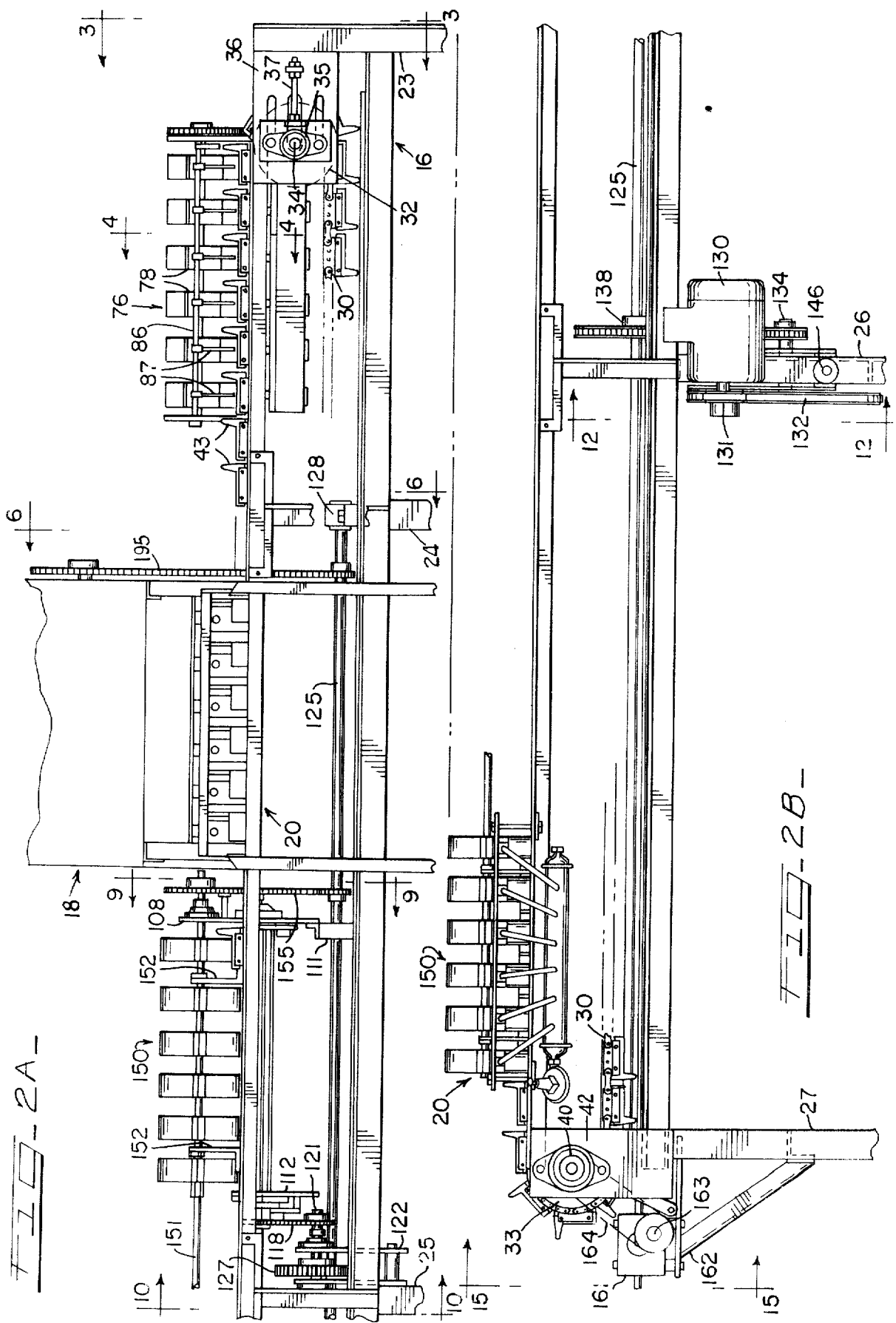

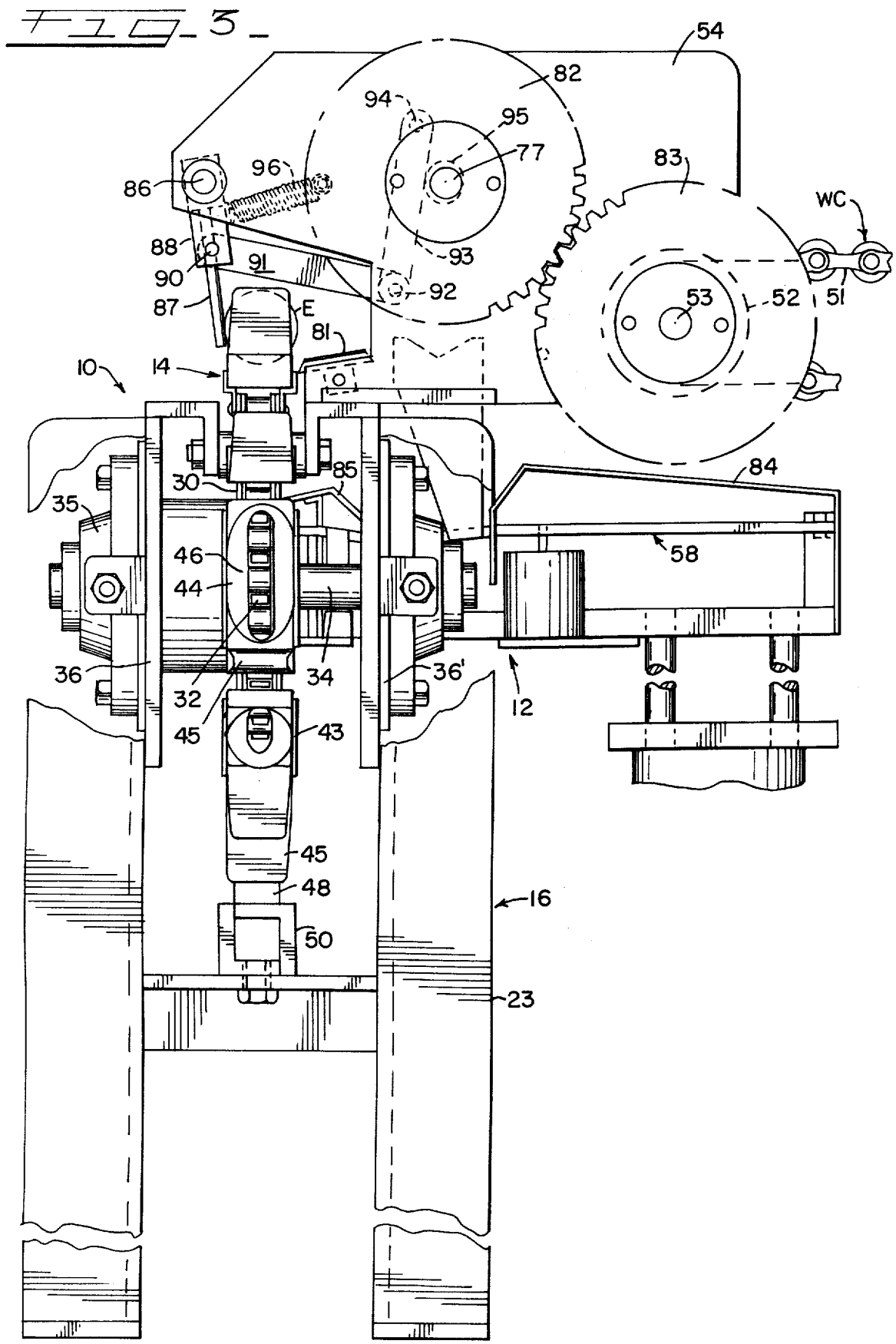

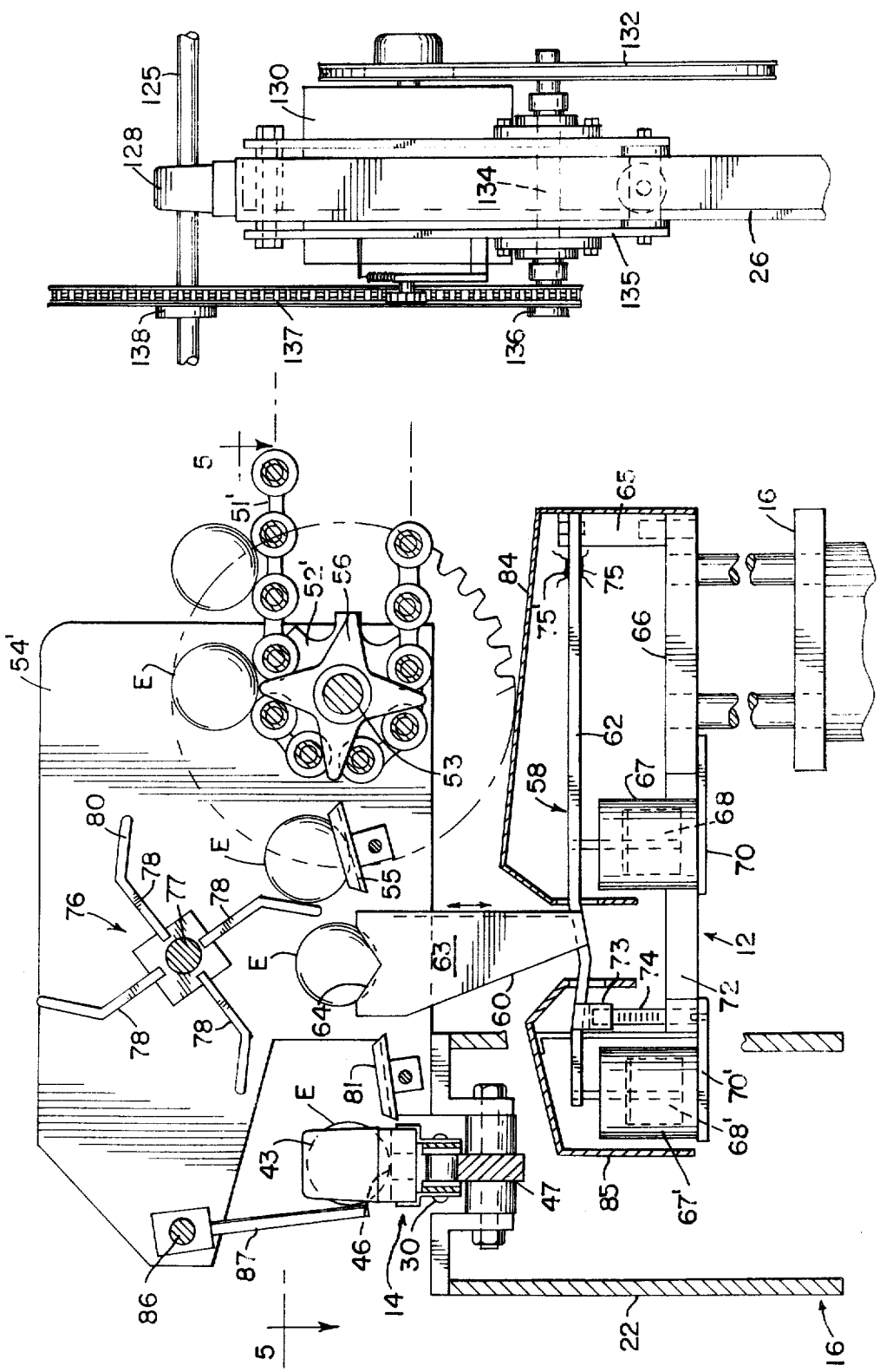

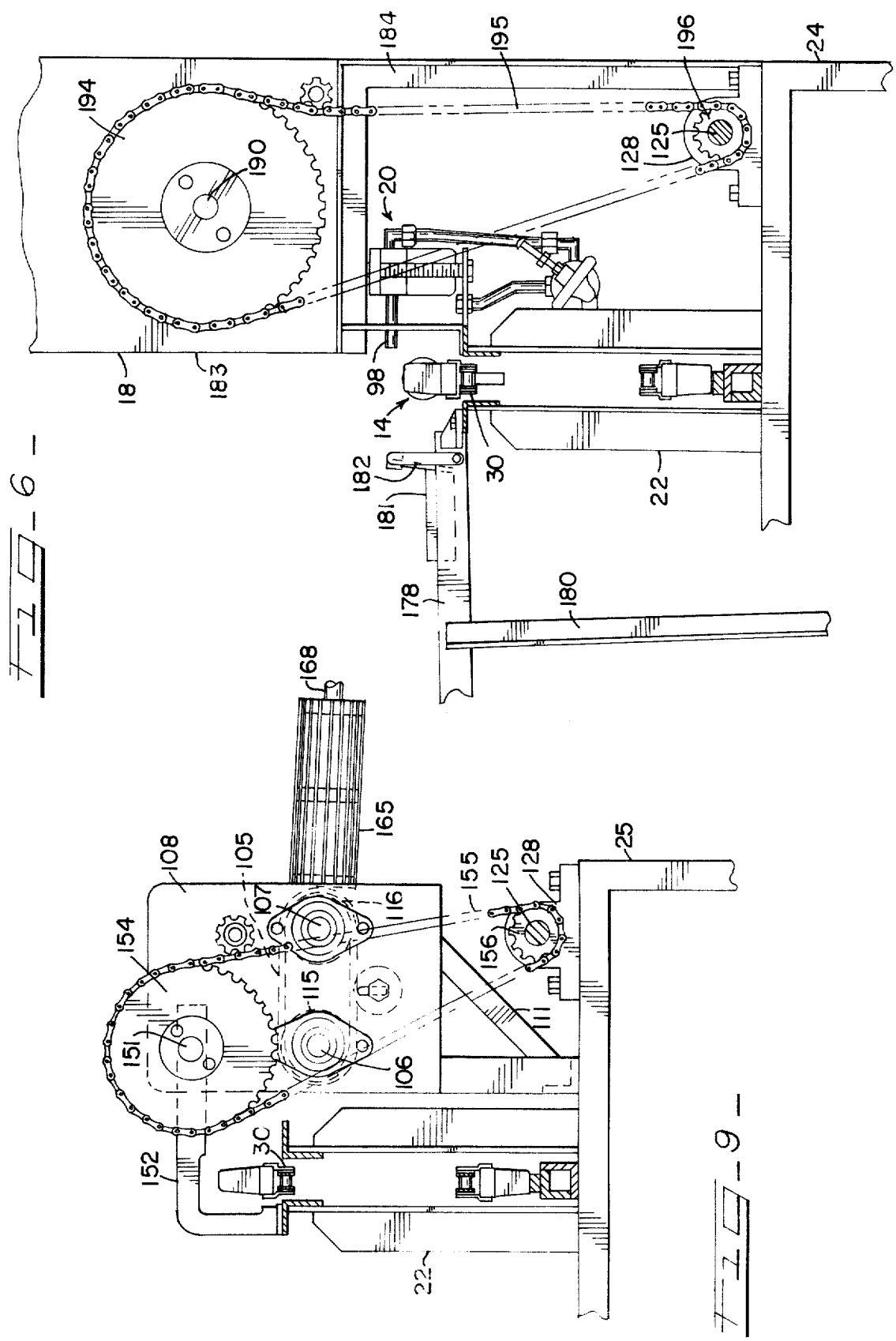

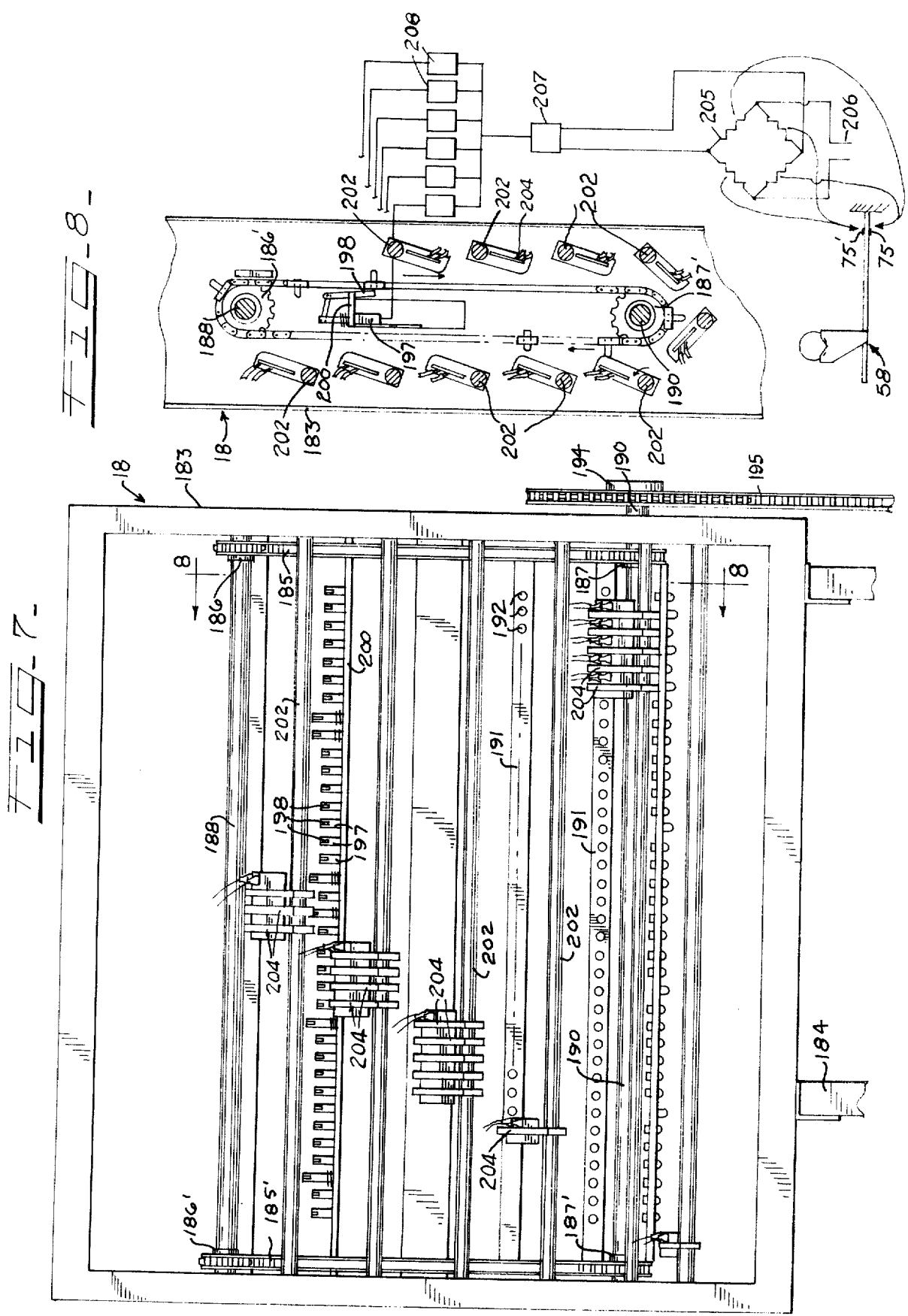

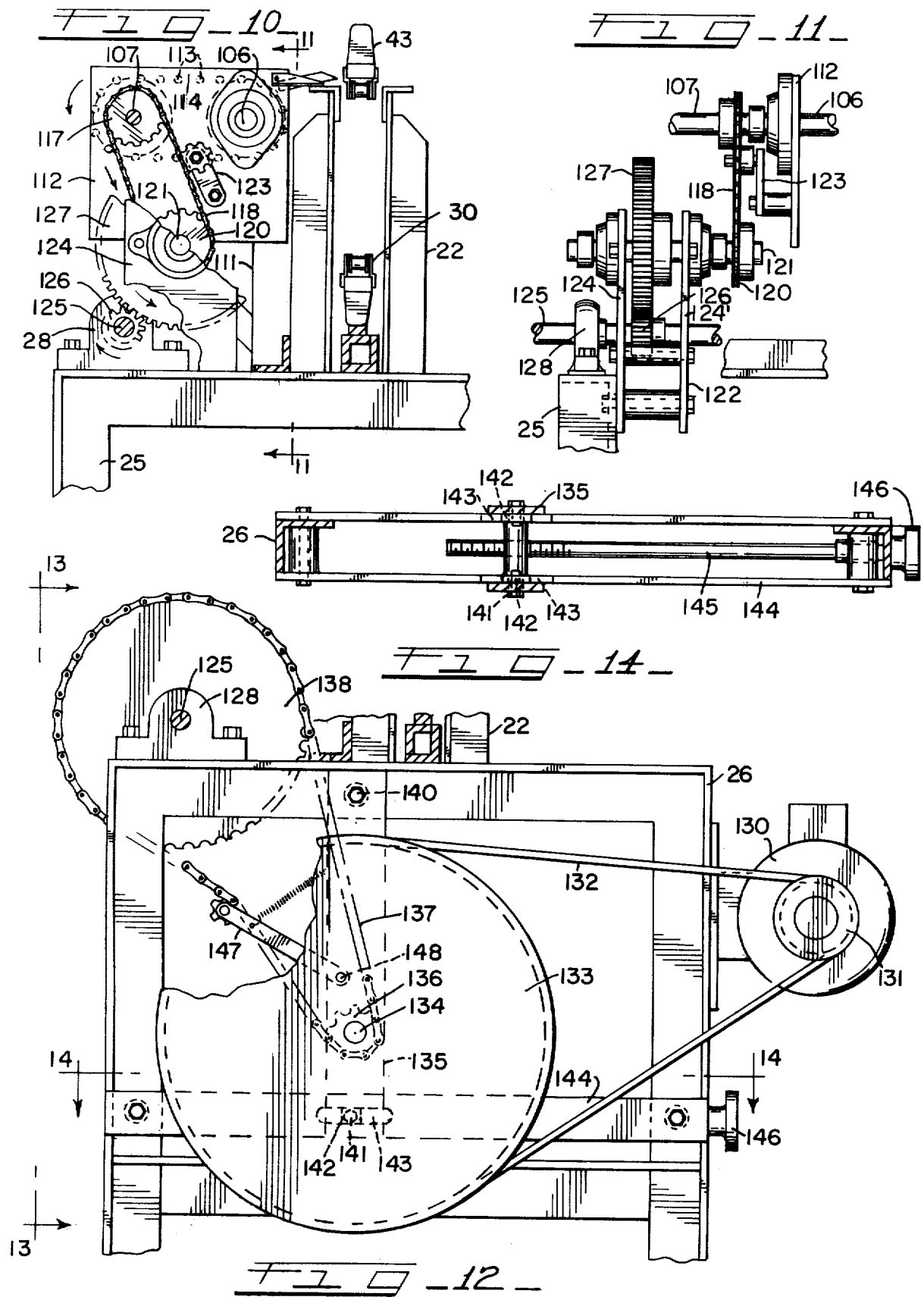

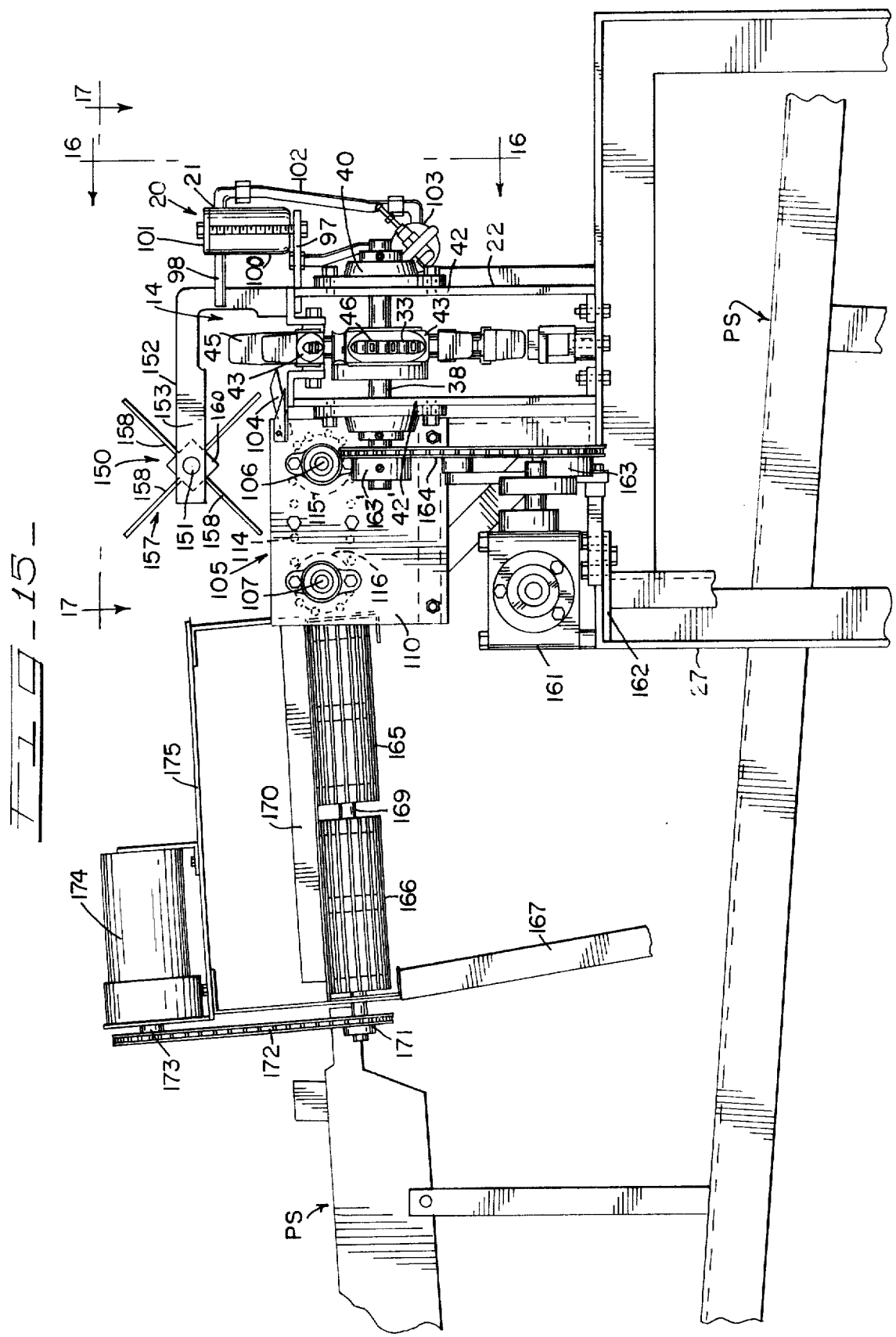

3,928,184

1

EGG HANDLING APPARATUS

This invention relates to the handling of shell eggs for marketing and is more particularly concerned with an improved method and machine for grading eggs according to their weight and transferring the eggs to a series of packaging machines each of which receives eggs of the same grade for packaging in cartons, or filler flats.

In the handling of shell eggs, for marketing in retail stores, for example, the customary procedure is to wash the eggs, subject them to candling operations so as to remove any which are inedible or otherwise unsuitable or undesirable for packing and then divide or separate the eggs into classes or grades for packaging, with the grading being based on the weight of the eggs. A generally accepted classification based on weight divides the eggs into six classes which are designed: Jumbo, Extra Large, Large, Medium, Small and Pee Wee. The range in weight for each grade may be varied somewhat but it is generally held to a recognized and accepted range which may be dictated by government regulation or customer demands.

Some efforts have been made to develop machinery for handling the several operations required to properly prepare eggs for marketing in a satisfactory manner in cartons or similar containers which are available in numerous forms. Generally, the machines provided have been in the form of separate units for washing, candling, grading and packaging, with some units adapted for co-operation with other units in an egg packing room. Some machines have been provided which incorporate mechanism for grading the eggs and for separating them into groups for packaging but most of these machines have not been found sufficiently productive in operation, or because they are too costly, or for other reasons, they have not been considered entirely satisfactory. It is a general object, therefore, of the present invention to provide an improved machine which is designed for accepting eggs from a supply source, for automatically grading the eggs according to their weight and for delivering them to separate grade areas where they are adapted to be fed to co-operating packing machines and which operates with substantially greater operator productivity than the machines heretofore provided for this purpose.

A more specific object of the invention is to provide an improved system and machine for grading eggs which may be readily incorporated in an egg handling line, which will automatically weigh the eggs delivered to the machine and convey them to a series of discharge areas where they are delivered according to their size as determined by individual egg weighing mechanisms operating at the entrance end of the machine.

Another object of the invention is to provide a machine for handling shell eggs having an electronic mechanism for weighing the individual eggs which is readily adjustable so as to separate the eggs into groups of predetermined weight range and which is adapted to control the delivery of the eggs to separate areas according to their weight range.

Another object of the invention is to provide an improved egg grading machine which incorporates a multiunit weighing mechanism from which the eggs are transferred to a pocketed single line conveyor for advance to a series of discharge areas spaced along the conveyor where the eggs are discharged from the con-

2 veyor pockets by mechanisms which are actuated under the control of a memory device which is operating in response to the weight of the individual eggs as registered on the weighing mechanisms.

A further object of the invention is to provide an improved egg grading machine wherein the eggs are initially presented to one or more strain gauge weighing devices which weighing devices are electrically connected to a memory device, with the eggs being transferred from the weighing devices to a single line conveyor for advance to a series of discharge stations at which there are mechanisms for removing the eggs from the conveyor, which mechanisms are controlled in their operation by the memory device, so as to discharge, at each of the stations, eggs of the same weight classification, as determined by the weighing devices.

A still further object of the invention is to provide an egg grading machine having provision for weighing individual eggs, for operating a memory device in accordance with the weight of each egg, for transferring the eggs to a traveling conveyor, for advancing the eggs to a series of discharge areas and for discharging at each of the discharge areas eggs having the same weight classification by means of a mechanism which is actuated by the memory device.

Another object of the invention is to provide an egg handling machine having a traveling conveyor for advancing a line of eggs to a discharge area and an air jet mechanism at the discharge area which is operable to move individual eggs off the conveyor in a laterally extending path.

These and other objects and advantages of the invention will be apparent from a consideration of the egg handling machine which is shown by way of illustration in the accompanying drawings wherein:

FIG. 1 is a plan view, largely schematic, of an egg handling system or apparatus which incorporates therein egg grading and handling mechanism embodying the principal features of the present invention;

FIGS 2A and 2B constitute an elevational view showing the forward or front side of the machine of FIG. 1, to a larger scale, the view being taken on the line 2—2 of FIG. 1, with portions thereof being omitted or broken away;

FIG. 3 is an end elevation at the entrance end of the grading machine of FIG. 1, the view being to a larger scale and being taken on line 3—3 of FIG. 2A with portions broken away;

FIG. 4 is a cross sectional view taken on the line 4—4 of FIG. 2A, to a larger scale, the view showing the egg weighing mechanism;

FIG. 6 is a cross sectional view, taken on the line 6—6 of FIG. 2A, to a larger scale;

FIG. 7 is a partial elevational view showing the front side of the memory device;

FIG. 8 is a cross sectional view taken on the line 8—8 of FIG. 7, with a schematic representation of the electrical circuit connecting the strain gauge weighing mechanism and the memory device;

FIG. 9 is a cross sectional view taken on the line 9—9 of FIG. 2A, to an enlarged scale;

FIG. 10 is a cross sectional view, taken on the line 10—10 of FIG. 2A, to an enlarged scale;

FIG. 11 is a sectional view taken on the line 11—11 of FIG. 10;

FIG. 12 is a cross sectional view taken on the line 12—12 of FIG. 2B, to an enlarged scale;

FIG. 13 is an elevational view taken on the line 13—13 of FIG. 12;

FIG. 14 is a sectional view taken on the line 14—14 of FIG. 12;

FIG. 15 is an end elevation taken on the line 15—15 of FIG. 2B to an enlarged scale;

Figure 1:
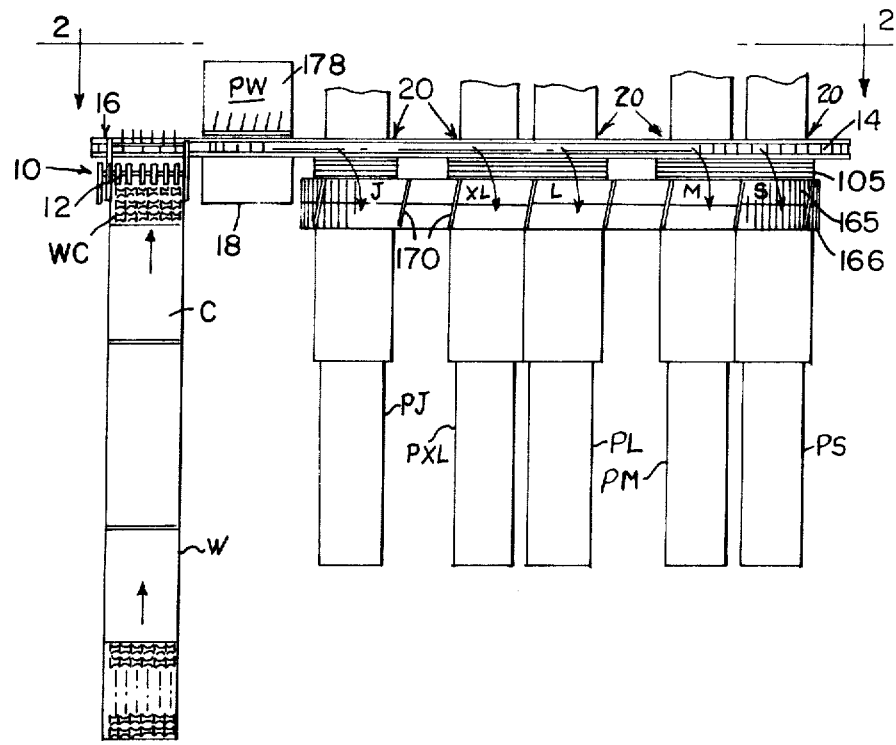

Referring to FIG. 1 of the drawings, there is illustrated, largely schematically, a system for handling shell eggs which includes apparatus embodying the invention for weighing each individual egg and for transporting the eggs to a plurality of separate areas, according to their weight, for transfer to packing machines or further handling apparatus. In the arrangement illustrated the eggs are supplied to the apparatus from an egg washing machine W so as to insure that only clean eggs will be packed. The eggs are delivered from the washer W by the washing machine conveyor WC and advanced through a candling booth C to the entrance end of a grading apparatus 10. The conveyor WC may be of the type illustranted in U.S. Pat. No. 2,979,746, granted to Charles H. Willsey, on Apr. 18, 1961. The apparatus may be fed eggs from any other suitable source of supply. In the form of the machine shown, the washer conveyor WC (FIGS. 1, 4 and 5) delivers freshly cleaned eggs to the grading apparatus 10 in successive rows of six eggs each, the rows extending transversely of the conveyor WC. A weighing mechanism 12 is arranged at the entrance end of the grader apparatus 10 which comprises a separate weighing device for each of the six eggs in each successive line or row thereof. The eggs E are advanced by the conveyor Wc to the weighing apparatus 12 and upon the weight of each egg being determined the eggs are delivered or transferred to a single line conveyor 14, which conveyor provides spaced pockets in which the eggs are carried. The conveyor 14 extends the full length of the conveyor support frame 16 and transfer apparatus 20 is provided along the frame 16 for removing the eggs from the pocketed conveyor 14 at one of six discharge or transfer areas which are spaced along the conveyor 14 and designated PW, J, XL, L, M and S, each such area being provided for one of the six weight grades into which the eggs are to be divided according to their weight, namely, Pee Wee, Jumbo, Extra Large, Large, Medium and Small. The smallest eggs, which are commonly classed as Pee Wees, are taken off at the PW area and generally these are not packaged or marketed in the same manner as the other five grades. At each of the other transfer areas there is arranged a packing apparatus for receiving the eggs of that particular grade and for packaging them in cartons or filler flats for further handling. The packers are indicated at PJ, PXL, PL, PM, and PS and each of these may be, for example, constructed in accordance with the disclosure in the copending application of Charles H. Willsey, Ser. No. 355,310, filed Apr. 30, 1973, or any similar packing apparatus which will receive the eggs from the designated area as they are transferred from the single line conveyor 14 and perform the necessary operations for placing the eggs in cartons, filler flats or the like.

A memory apparatus or memory device 18 is disposed at the PW area along the conveying apparatus 14 and immediately adjacent the weighing apparatus 12. At each of the grade or transfer areas J, XL, L, M and S there is provided an apparatus 20 (FIGS. 2B, 6, 15 to 17) which is controlled through the memory device for removing the individual eggs E from the pockets of the conveyor 14 and for transferring the same to the infeed mechanism for the packer at that area. Each transfer apparatus 20 comprises six individual transfer devices 21 corresponding to the six in a row arrangement of the eggs which are fed to the grader by the conveyor WC. The individual transfer devices 21 are operated by the memory device 18 according to the weight classification of the eggs. The weighing apparatus 12 is electrically connected to the memory device 18 and operates apparatus in the memory device according to the weight of the individual eggs which enables the memory device to control the operation of the individual transfer devices 21 of each transfer apparatus 20. Each egg is weighed and the memory device 18 is actuated through the weighing apparatus 12 so as to set the same for operation of the proper transfer device 21 to discharge each egg at the properdischarge area according to the weight as determined by the weighing device.

The grader or grading apparatus 10 is supported on the elongate frame 16 (FIGS 2A, 2B, 4, 6 and 15) with the single line pocketed egg conveyor or egg carrier 14 being mounted on a relatively long and relatively narrow top frame structure 22 which is supported in elevated position by an upstanding end frame 23 (FIGS. 2A and 3) at the entrance end thereof which end frame 23 is relatively narrow and extends to the top of the conveyor support frame 22. Cross frames 24, 25, 26 and 27 are spaced along the bottom of the frame 22 and provide a support for the intermediate and far end portions of the frame 22, the cross frames 24, 25, 26 and 27 being substantially wider than the entrance end frame 23.

The egg carrying conveyor 14 comprises an endless chain 30 (FIGS. 2A, 2B, 3 to 6 and 15) mounted on end sprockets 32 and 33 at opposite ends of the conveyor frame assembly 22. The sprocket 32 at the entrance end of the grader 10 is mounted on an idler shaft 34 journaled in bearing members 35 which are slidably mounted on transversely spaced support plates 36, 36' on opposite sides of the conveyor support frame assembly 22. Suitable mechanism, indicated at 37, is provided for adjusting the position of the bearing members 35 longitudinally of the frame 22 so as to maintain the proper tension in the chain 30. At the opposite end of the conveyor frame structure 22 the sprocket 33 is supported on a cross shaft 38 journaled in bearing members 40 on parallel, transversely spaced side plates 42, 40' on the frame structure 22. The shaft 38 is driven in a manner hereinafter described. The chain 30 carries a series of egg supporting pocket members 43 which are of angular shape with one leg 44 attached to the chain 30 so that it is disposed horizontally along the top run thereof and the other leg 45 extending outboard of the plane of the chain. A cradle-like recess 46 in the leg 44 forms a pocket for supporting a single egg therein with the long axis extending lengthwise relative to the path of the chain. The top run of the conveyor chain 30 is supported on an elongate guide forming bar 47 (FIGS. 3 and 4) mounted in the top of the conveyor frame structure 22 while the bottom run of the chain 30 is carried on a support bar 48 forming part of a supporting structure 50 at the bottom of the frame structure 22, with the outermost end edge of the outboard legs 45 of the pocket forming members 43 riding on the support bar 48.

Figure 5:
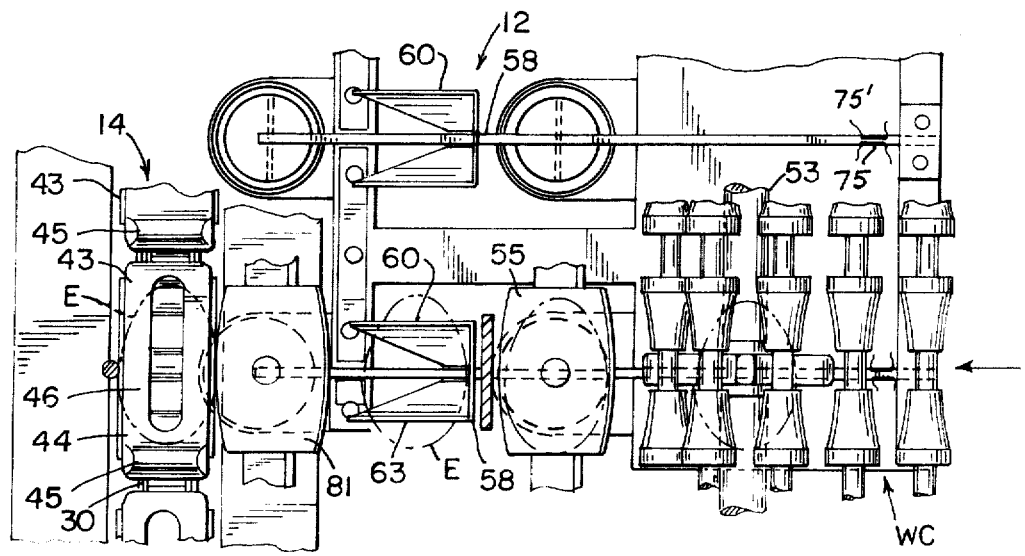
FIG. 5 is a sectional view at the entrance end of the grading machine, the view being taken on the line 5—5 of FIG. 4.
Figure 16:
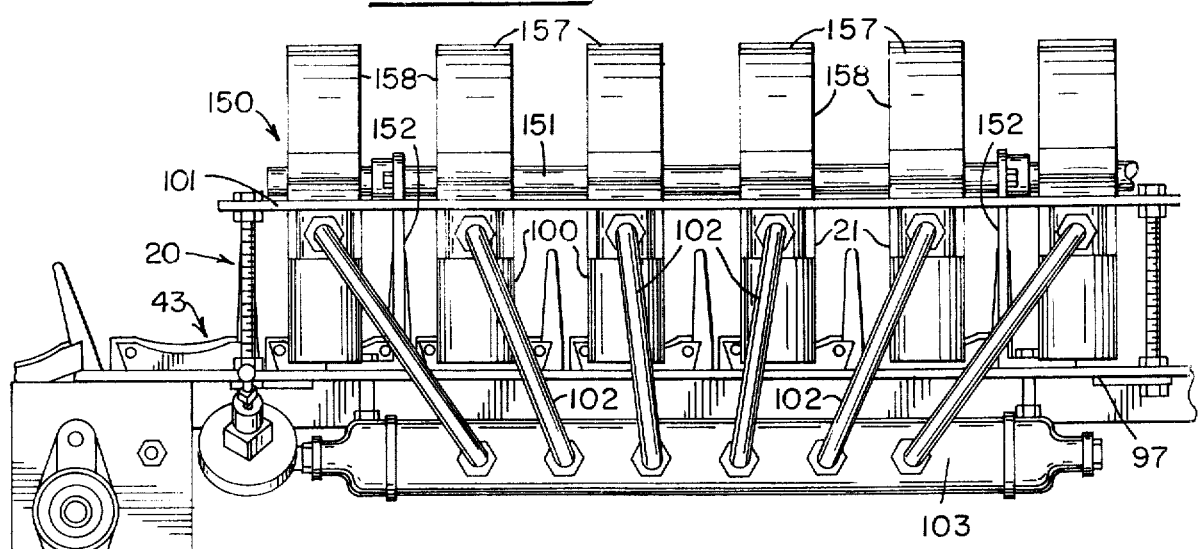
FIG. 16 is a fragmentary, elevational view taken on the line 16—16 of FIG. 15, to an enlarged scale.

Eggs are supplied to the grader 10, in the illustrated arrangement, on the roller-type conveyor WC running from the washing machine W through the candler C, with the eggs arranged in successive rows of six and with each egg carried in a pocket of the conveyor. As shown in FIGS. 3 and 5, the egg delivery conveyor WC is a cross bar roller and chain-type which extends to the weighing mechanism 12 with the side chains 51, 51' being supported at the delivery end on the sprockets 52, 52' mounted in axially spaced relation on a cross shaft which is journaled in a pair of laterally spaced, parallel, upstanding side plates 54, 54' at the entrance end of the single line conveyor 14. A cross over ramp or chute 55 extends between the end of the conveyor WC and the weighing assembly 12 for directing the eggs onto the egg weighing devices. A starwheel 56 on the conveyor shaft 53 insures uniform discharge of the eggs from each row of the conveyor pockets as the eggs in each row advance to the end of the conveyor, the smaller eggs being lifted out of the pockets for simultaneous discharge with the larger eggs which will roll out unassisted.

The egg weighing assembly 12 comprises a series of spaced strain gauge weighing devices or members 58 (FIGS. 4 and 5) each aligned with a pocket in the conveyor WC so as to receive an egg from the same. Each of the strain gauge devices 58 comprises an egg receiving and supporting frame member 60 which is upstanding from a generally horizontally disposed rigid bar member 62. The egg supporting member 60 is in the form of an upstanding bent plate having a U-shaped horizontal section. The egg lies on oppositely disposed, spaced side plates 63 and 63' which are notched out at 64 in the top edge to form a cradle-like support onto which an egg is delivered from the pocketed conveyor WC. The bar member 62 is mounted at its trailing end on the upstanding leg 65 of an angular support member which has a horizontal leg 66 disposed in a generally horizontal plane and fixed on a portion of the support frame 16. The egg support member 60 is disposed near the free end of the gauge bar 62 and between a pair of dash pots 67 and 67' which have piston forming members 68 and 68' depending from the bottom face of the bar member 62. The dash pot members 67 and 67', which cushion the movement of the bar 62, are mounted on bracket forming plates 70 and 70' attached to the support plate 66 and an extension 72 of the same. The bar 62, at a point adjacent the forward dash pot 70', rests within upwardly opening socket forming members 73 which are supported on the upper ends of upstanding guide posts 74, the latter being supported on the extension plate 72. The strain gauge bar members 62 carry pairs of the strain gauge elements indicated at 75 and 75' (FIGS. 4 and 8) which form a bridge circuit and are connected to the memory device for actuating time lapse elements therein as hereinafter described The weight of an egg on the support member 63 depresses the end of the bar 62 and tensions and compresses the elements 75' and 75 respectively. Resistance to current flow is varied by tension in the elements and this is employed through the control circuit and the memory device to operate mechanism for discharging the eggs from the single line conveyor when the individual eggs reach the proper discharge area for the particular grade.

To provide for properly timed uniform movement of the eggs onto the weighing platform 60 and from the weighing devices into the pockets 46 of the conveyor 14 a paddle wheel device 76 is mounted on cross shaft 77 which is journaled in side plates 54, 54' immediately above the weighing scale platforms 60. The paddle wheel 76 has four circumferentially spaced, radially extending arm members 78, each with an angled end portion 80. The paddle arm members 78 are constructed and the cross shaft 77 is positioned and rotated as shown in FIG. 4 so that the arms 78 traverse a clockwise path so as to enable the trailing face of each arm portion 80 to hold back an oncoming egg which has advanced onto the crossover chute 55 while the preceding egg is on the weighing scale platform 60. The forward or leading face of the same arm portion 80 serves to advance the egg on the platform after it has been weighed, causing the egg to roll onto crossover chute 81 and into the pocket 46 in the aligned pocket forming member 43 on the conveyor 14. At the same time the next egg is allowed to advance onto the platform member 60 as the arm portion 80 rotates. The next arm portion 80 moves down in front of the next oncoming egg and eases it onto the crossover chute 55 where its forward movement is retarded by the arm portion 80 while the preceding egg is on the weighing platform 60. The paddle wheel supporting shaft 77 is extended at the one end and a gear 82 (FIG. 3) is mounted thereon which is driven by connection with a gear 83 on the end of the conveyor shaft 53, the conveyor WC being driven from the other end thereof by suitable drive means. Suitable cover plates 84 and 85 are provided for the weighing mechanism 12 to protect the same from damage and dirt.

An egg guiding and movement retarding device is provided along the conveyor 14 at the entrance end thereof which comprises a shaft 86 (FIGS. 2A and 3) journaled in the side plates 54, 54' with a series of finger-like radially extending rods 87 which depend from the shaft 86 and extend to a point a short distance above the pocket forming members 44 on the conveyor 14. The shaft 86 and arms 87 are oscillated so that the arms 87 meet the eggs as the eggs advance over the crossover chute 81 and onto the pocket forming members 43 so as to guide the eggs into the pockets 46 and insure that they do not go beyond the same and that they are properly located in the pockets 46 for advance by the conveyor 14. The shaft 86 has a radial arm 88 (FIG. 3) at one end thereof which is of relatively short length and which has its free end pivotally connected at 90 to a link bar 91. The link bar 91 has a pivotal connection at 92 with a co-operating link bar 93, the other end of which is pivoted at 94 on the plate member 54 at a point above the cross shaft 77. A cam 95 on the cross shaft 77 engages the link bar 93 and oscillates the arms 87 in timed relation to the movement of the paddle wheel 76 so as to synchronize the movement of the arms with the advancing movement of the eggs by the paddle wheel arms 78. A tension spring 96 is connected at one end to the radial arm 88 and at the other end to an anchor point on the plate 54 for holding the link bar 93 in engagement with the track on the cam 95.

As the eggs are advanced by the single line conveyor 14 along the machine each egg is removed at the proper discharge area for the weight thereof by operation of the proper transfer apparatus 20 which is controlled through the memory device 18. The transfer apparatus 20 (FIGS. 2A, 2B, 6, 15, 16 and 17) at each of the transfer or discharge stations is constructed in an identical manner and only one apparatus 20 will be described. Each transfer apparatus 20 (FIGS. 15 to 17) is mounted by means of a bracket structure 97. Each such apparatus comprises six individual transfer devices 21 which transfer devices are spaced along the conveyor 14 according to the spacing of the pockets 46. Each transfer device 21 comprises a jet discharge nozzle 98 and an associated air control valve 100 mounted on a top bar 101 of the mounting structure 97. Each control valve 100 is connected by a short air conduit 102 to a manifold 103 which is supplied with air under pressure from a suitable source and provided with the necessary filter and pressure control devices. The transfer apparatus 20 is mounted on the forward side of the conveyor frame 22 at all the discharge stations except station PW where the apparatus 20 (FIG. 6) is mounted beneath the memory device 18 on the rearward side of the frame 22.

Figure 18:
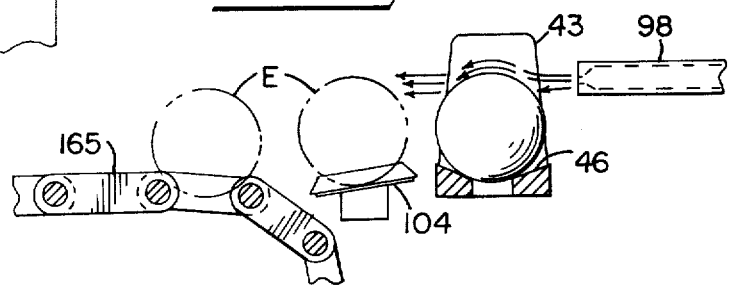
FIG. 18 is a schematic view illustrating the operation of the egg transfer apparatus.
Figure 17:
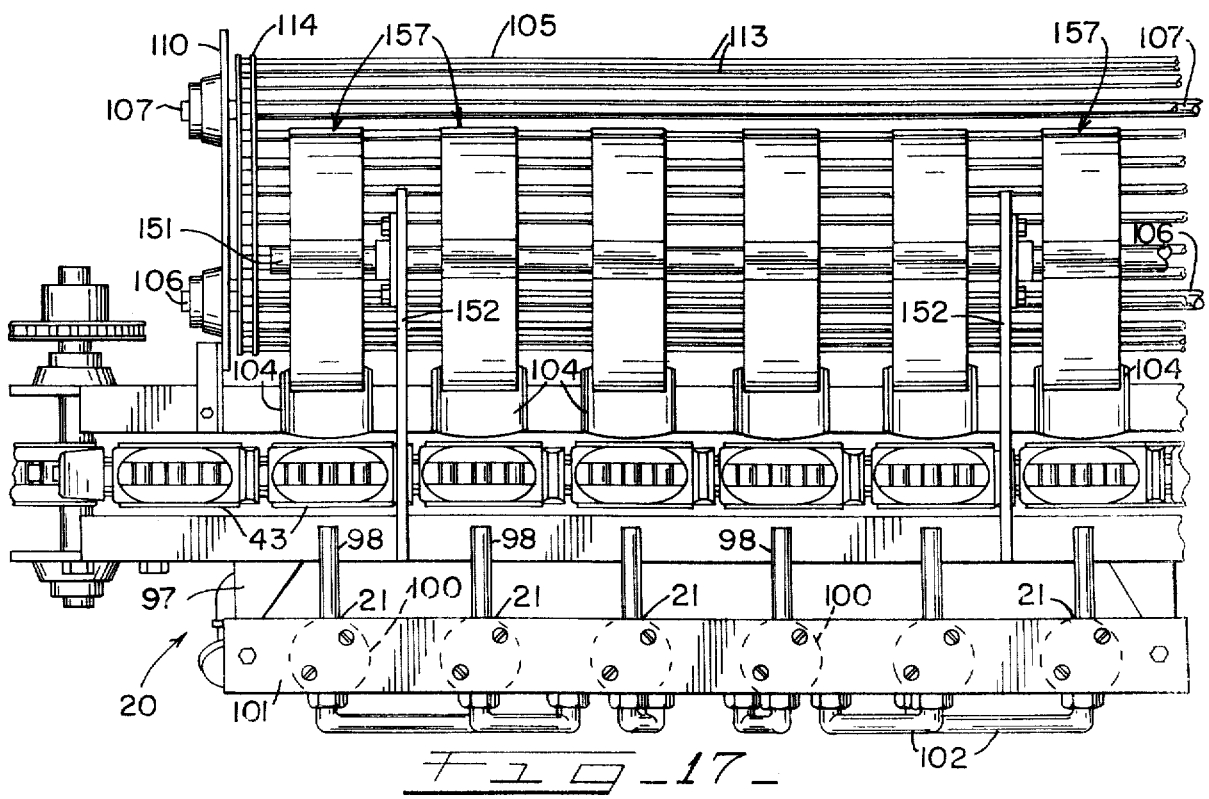
FIG. 17 is a fragmentary plan view, taken on the line 17—17 of FIG. 15, to an enlarged scale.

The air jet nozzles 98 are mounted at an elevation relative to the path of the pockets 46 on the top run of conveyor 14 in which the eggs are carried so as to direct the air across the top portion of an egg E as illustrated in FIG. 18 which lifts the egg out of the conveyor pocket 46 and transfers the egg across a short inclined crossover ramp 104 to a small rod-type conveyor 105 (FIGS. 15 and 17) which is mounted at the rear of the conveyor support frame 22. The discharge ramp or crossover chute 104 is mounted in multiple arrangement on the rear top portion of the conveyor support frame as shown in FIG. 17 and provides an individual chute or channel member 104 for each of the transfer devices 21.

The rod conveyor 105 (FIG. 1) extends along the five discharge areas J to S inclusive, and is sectionalized so as to convey the eggs which are delivered at each of the discharge areas. The conveyor assembly 105 is mounted on a pair of shafts 106 and 107 (FIGS. 9, 10, 15 and 17) which are journaled in end plates 108 and 110 forming part of an auxiliary support frame 111 at the rear of the conveyor 22. Each section of the conveyor 105 extends at one of the discharge areas with a double section at each of the double areas XL, L and M, S. Each of the conveyor sections extends between a pair of spaced vertical support plates, the support plates at opposite ends of the entire conveyor being shown at 108 and 110 in FIGS. 9 and 17 and an intermediate plate being indicated at 112 in FIG. 2A and FIG. 10. Each section of the conveyor 105 (FIGS. 15 and 17) comprises a series of relatively small diameter rod members 113 extending between a pair of endless chains 114. The chains 114 are carried on pairs of axially spaced sprockets 115 and 116 on the shafts 106 and 107. The shaft 107 serves as a drive shaft while the shaft 106 constitutes an idler shaft and may be sectionalized with the sections of the conveyor. The shaft 107 is driven as shown in FIGS. 10 and 11. A sprocket 117 on the shaft 107 is connected by the chain 118 with a sprocket 120 on a stub shaft 121 which is journaled in an auxiliary frame 122 mounted on the cross frame 25. A tensioning or slack take-up device 123 is provided for the chain 118. The auxiliary support frame 122 comprises vertically disposed, spaced, parallel plates 124, 124' in which the stub shaft 121 is journaled. The stub shaft 121 is driven by main shaft 125 through a small gear 126 on the main drive shaft 125 which engages with a larger gear 127 on the stub shaft 121. The arrangement provides a reverse direction so that the travel of conveyor 105 is in proper direction as indicated in FIG. 10.

The drive shaft 125 is supported in suitable bearings 128 mounted in spaced relation along the main frame 16 of the machine on the top portions of the cross frames 24, 25, 26 and 27. The shaft 125 is driven by motor 130 (FIGS. 2B and 12 to 14) which is mounted on the forward side of the cross frame 26. A variable diameter drive pulley 131 on the power output shaft of motor 130 is connected by a belt 132 with pulley 133 which is mounted on a stub shaft 134 journaled in a vertically disposed supporting frame structure 135. The stub shaft 134 carries a sprocket 136 which is connected by a chain 137 with a sprocket 138 on the drive shaft 125. The frame 135 carrying the stub shaft 134 is pivotally mounted at 140 on the top of the cross frame 26. The bottom of the frame 135 is adjustably mounted so as to co-operate with the variable pulley 131 in adjusting the speed of the shaft 125. A cross pin 141 at the bottom of the pivoted frame 135 carries on its extended ends slidable blocks 142 which are operative in guide slots 143 in a subframe 144 extending across frame 26 in which there is mounted an adjusting rod 145 having its threaded end engaged in a threaded bore of the cross pin 141. The adjusting rod 145 is rotatable in the cross frame 144 and has a knob 146 enabling manual adjustment of the position of the pulley 133 relative to the variable speed pully 131. A takeup or tensioning device 147 is provided for the chain 137 which is pivoted at 148 on the vertical frame 135 and spring tensioned to maintain proper engagement of the chain 137 with the sprockets 136 and 138.

In each of the discharge or transfer areas J, XL, L, M and S there is a paddle-wheel arrangement 150 for retarding the eggs and guiding the same as they are transferred from the pockets of the conveyor 14 to the crossover chute 104 and onto the conveyor 105. The paddle wheel arrangement 150 at each of the discharge areas is supported on a common longitudinal shaft 151 which extends from the vertically disposed mounting or support plate 108 (FIGS. 2A, 2B, 9, 15 and 17) adjoining the memory device 18 to a point very nearly the end of the support frame 16. Each arrangement 150 or assembly of paddle wheel member is of the same construction and only one will be described. Each assembly 150 includes a pair of support brackets 152 as shown in FIGS. 9 and 15 to 17 which are of angular shape and which are mounted on the conveyor frame structure 22 with the horizontal leg 153 extending across the conveyor 14 and supporting the shaft 151 above the entrance to the rod conveyor sections 105. Each pair of the shaft supporting brackets 152 is spaced axially of the shaft 151 and mounted adjacent the opposite ends of the assembly. The shaft 151 is extended at the end adjacent the memory device 18 and mounted in the plate 108 so as to mount thereon a sprocket 154 which is connected by a chain 155 with a sprocket 156 on the main drive shaft 125. Each paddle wheel group assembly 150 comprises six paddle wheel devices 157 at each of the discharge areas corresponding to the six egg discharge or transfer devices 21. Each paddle wheel device 157 comprises four paddle arm members 158 spaced circumferentially about the shaft 151 which extend radially from a hub 160. Each arm member travels in a circular path extending above the chute 104 and the entrance portion of the rod conveyor 105. The shaft 151 is driven to rotate the arm members 158 in timed relation to the movement of the conveyor 14 and the operation of the air jets 98 so that the eggs are transferred from the pockets of the conveyor 14 to the chute members 104 and guided onto the conveyor 105 by successive paddle wheel arms 158 which provide egg to egg separation and prevent egg to egg contact with possible breakage when successive eggs are ejected by the same air jet.

The main drive shaft 125 extends to a right angle gear box 161 (FIGS. 2B and 15) mounted on the top of the cross frame 27 at the end of the machine by means of a platform type bracket 162. The right angled gear box 161 has an output drive with a sprocket 163 which is connected by drive chain 164 with a sprocket 163 on the shaft 38 which provides the drive for the conveyor 14.

The eggs are advanced by the sections of the conveyor 105 to a pair of accumulator belts 165 and 166 (FIGS. 1, 9 and 15) running lengthwise of the machine at the back of the main frame 16. The accumulator belts 165 and 166 may be a wire mesh type as employed in the machine described in Ser. No. 355,310. The belts 165 and 166 are mounted on an auxiliary frame structure indicated at 167 in FIG. 15 which extends rearwardly of the conveyor structure 105. The two conveyors 165 and 166 are supported at opposite ends of the machine on cross shafts 168 and 169 with each of these shafts acting as a drive shaft for the one conveyor and as an idler shaft for the other conveyor, the two conveyors being driven in opposite directions. Upstanding separator bars 170 are spaced along the top runs of the conveyors 165 nd 166 so as to separate the discharge areas J, XL, L, M and S. The drive arrangement for the one conveyor is illustrated in FIG. 15. The shaft 169 carries a sprocket 171 on an extended end thereof which is connected by a chain 172 with a sprocket 173 on a motor 174, with the latter mounted on an inverted U-shaped frame portion 175. The one conveyor is mounted on end supports which are rotatable on the shaft 169 while the other conveyor is mounted on end supports which rotate with the shaft 169. At the opposite end of the conveyors 165 and 166 the reverse drive arrangement is provided and the shaft 168 is driven in a manner duplicating the drive for the shaft 169 by a similar drive arrangement (not shown). The two conveyors 165 and 166 serve as agitators and accmulators for feeding the eggs to the packers at each of the discharge areas.

At the PeeWee area (FIG. 6) there is provided a small pan or tray 178 which is mounted on a stand 180 and which extends laterally of conveyor 14. Eggs of the PeeWee size are transferred from the conveyor 14 by the air jets 98 of the transfer assembly 20 to the pan 178. A series of laterally spaced, vertically disposed plates 181, of rubber or simialr material, are arranged on a supporting structure 182 and serve as guide channel members and retarders for directing the PeeWee eggs onto the tray from which they are subsequently removed in any desired manner.

The memory device 18 (FIGS. 1 and 6 to 8) is mounted in a housing in the form of a rectangular frame or box 183 which is supported by framing 184 above the conveyor frame 22. The housing or box 183 encloses a conveyor arrangement comprising laterally spaced, endless traveling chains 185 and 185' which are mounted on pairs of top and bottom end sprockets 186, 186' and 187, 187'. The sprockets 186, 186' and 187, 187' are mounted in axially spaced relation on top and bottom support shafts 188 and 190 and the chains are connected by a plurality of cross rods 191 arranged in predetermined spaced relation along the length thereof. Each of the rods or bars 191 has mounted thereon a plurality of spaced pins 192. There are 36 pins 192 mounted in sleeve forming bores in each of the cross bars or rods 191 which may be slidably positioned in either an inboard or outboard projecting relation relative to the plane of the vertical runs of the cross bars. The pin members 192 are disposed in equally spaced relation along the length of the bar and thus provide a separate pin for each of the six weighing devices 58 of the machine and the six possible grades into which the eggs are to be divided, with the pins 192 in each bar being aligned, in the direction of travel of the conveyor assembly, with the pins in each of the other bars. The top support shaft 188 serves as an idler shaft and the bottom support shaft 190 serves as the drive shaft for the conveyor assembly. The shaft 190 is extended at one side of the frame 183 and carries on its end a sprocket 194 (FIG. 6). The sprocket 194 is connected by a chain 195 with a drive sprocket 196 on the main drive shaft 125. The drive is arranged to synchronize the travel of the bars 191 with the travel of the conveyor 14. A series of pin actuating divices 197 (FIGS. 7 and 8) having pivotally mounted solenoid operated striker arms or paddles 198 are supported on a cross frame or panel member 200 immediately below the top cross shaft 188 and between the forward and back vertical runs of the conveyor chains 185 and 185'. The striker arms 198 are 36 in number, corresponding to the number of pins 192 in the conveyor bars 191, and the arm members 198 are arranged so as to be aligned in the direction of travel with the pins 192. The striker arms 198 are adapted to be pivoted by the actuating solenoids so that when actuated they strike a pin 192 and move it to an outboard projecting position as illustrated in FIG. 8. A series of switch supporting cross rods or cross bar support members 202 are mounted in the housing 184 in parallel relation and in spaced relation along the path of travel of the conveyor carried pin bars 191. Each of the fixed cross rods 202 carries one or more switch members 204 positioned at predetermined points on the respective cross bar with each of the switches 203 being electrically connected to an air jet operating valve 100 at one of the transfer stations. Each of the switches 204 is positioned in the path of a set of the pins 192 on the cross bars 191 and arranged so that when a pin 191 is projected to an outboard position it will operate the switch member 204 as it passes the latter in its path. Each of the switch members 204 electrically controls a jet operating valve 100 at a transfer station so that when a switch 204 is operated by a pin 192, it actuates the valve 100 which it controls so as to operate the associated jet 98 and project a blast of air sufficient to remove the egg in the pocket which has been stopped at that air jet 98 and to transfer the egg to the rod conveyor 105. The arrangement is programmed so that each switch 204 operates the proper take-off jet, to transfer the egg which has set the pin for that switch, at the proper transfer area for that egg. This enables the spacing of the transfer areas along the conveyor to be varied as desired. The conveyor 14 will be indexed or cycled according to the number of weighing scales so as to provide empty pockets for receiving the next row of eggs when a row has been discharged from the scales but the spacing between the group of pockets at the weighing area and the PW take-off area, for example, may be any desired number of pocket lengths. In the machine illustrated (FIG. 2A) the PW take-off area is spaced from the scale area by three conveyor pocket lengths while the J take-off area, which is next, is spaced two pocket lengths from the PW area. The following take-off areas are spaced by six, two, six and two pocket lengths. With the spacing illustrated 10 cycles of conveyor movement are required to move a group of six conveyor pockets from the scale area to the small egg discharge area S which is the last take-off area at the far end of the conveyor 14. Since there is a switch 204 controlling the operation of each of the air jets 98, the 36 switches required for the six take-off areas PW, J, XL, L, M and S, are arranged on 10 cross bars corresponding to the ten cycles of movement of conveyor 14 required to move the group of six conveyor pockets past the take-off areas. There are three switches on the first cross bar 202 which is immediately below the pin setting mechanism 197 (FIG. 8) in the direction of advance of chains 185, 185'. The first six pocket indexing or cycling of the conveyor 14 will advance the first or leading three egg filled pockets of the group of six into transverse alignment with the three trailing transfer nozzles 98 of the air jet assembly 20 at the PW station. If there is a peewee egg in any of these three pockets the air jet 98 opposite the pocket will be operated to discharge the egg. The next indexing of the conveyor aligns the three trailing pockets of the group of six with the three leading air jets 98 at the PW station for take-off while the leading pocket of the group of six is aligned with the trailing air jet 98 at the J take-off area. The next switch supporting cross bar 202 has four switches 204 for actuating the proper nozzles 98 to take off any eggs in these four pockets. The switches 204 are located or grouped in such fashion on the supporting bars 191 and the bars 191 are spaced relative to the solenoid operated pin setting devices 198 so that when the travel of the chains 185, 185' is properly synchronized with the travel of the conveyor 14 the proper air jet device 21 will be operated at the proper time according to the weight of the egg in the conveyor pocket and transfer the egg in the pocket which is aligned opposite it at the group area for that weight egg.

The electrical control circuitry is shown diagrammatically in FIG. 8 where a single one of the strain gauge devices 58 is shown having its pairs of elements 75, 75' connected to form a Wheatstone Bridge 205 which receives power from lines indicated at 206. The bridge output is connected through an amplifier 207 to a set of sensors 208, each of which is electrically connected to one of the pin actuating devices 197. There are six sets of six sensors 208, each set being actuated by one of the strain gauge devices 58 and each sensor in a set corresponding to one of the six possible egg grades PW, J, XL, L, M and S. The egg transfer conveyor 14 is advanced six pockets at a time and the construction of the conveyor and associated members in the memory device 18 is such that the travel of the pin support bars 191 may be synchronized with the travel of conveyor 14 so as to properly time the discharge of the eggs according to the weight registered by the weighing devices and deliver each egg to the proper transfer or discharge area for eggs of that same weight characterization.

The manner in which the apparatus is used will be apparent from the foregoing description of the various mechanisms which are embodied in the apparatus. While in the arrangement illustrated eggs are supplied in six-in-a-row arrangement by a washing machine conveyor any other suitable supply arrangement may be provided with a different number of eggs in a row, if desired. The transfer conveyor arrangement may be varied also with rearrangement of the associated mechanisms as needed or desired.

The electronic weighing mechanisms which are in the form of strain gauges afford a very accurate and reliable weighing arrangement and permit a fine adjustable weighing of the weight range which may be readily accomplished with minimum shut down time. The use of a solid state mechanism also provides a degree of flexibility not obtainable with conventional mechanical systems. Each egg is weighed while at rest on the scale and adjustment of the circuit so that the output of the scale will actuate an indicator element. Fine circuit adjustment provides the desired flexibility while the mechanism is not affected by environmental changes such as temperature or the like. It is contemplated that a fully electronic or solid state memory system may be substituted for the electro-mechanical mechanism mechanism 18 and thereby eliminate any possibility of mechanical breakdown due to wear or damage to the pin setting and switch control arrangement of the illustrated mechanism.

The air jet transfer devices may be located on either side of the conveyor as illustrated at the PW and the other stations. The lack of mechanical contact with the eggs eliminates breakage and timing problems which are encountered with many mechanical handling devices. The ability to control the air pressure enables control of the velocity of the egg depending upon the size and weight of the egg and affords a high degree of flexibility. Uniform ejection or transfer of the eggs regardless of egg weight is obtainable.

I claim:

1. An apparatus for separating shell eggs into a predetermined number of groups, according to the weight of the individual eggs, in preparation for packing or further handling of the separated groups, which apparatus comprises an elongate support frame, a traveling conveyor having longitudinally spaced, individual egg accommodating pockets mounted on said support frame with the top run thereof traveling between a weighing area at the receiving end thereof and a series of transfer areas in the form of stations spaced along the length of said support frame, a plurality of individual egg weighing mechanisms arranged at said receiving end which are spaced along the conveyor according to the spacing of the egg accommodating pockets on said conveyor, means for intermittently driving the conveyor so as to position successive groups of pockets for receiving eggs from said weighing means, means for delivering successive eggs to the individual weighing mechanisms, means for transferring the eggs from the weighing mechanisms to pockets of the conveyor, means at each transfer station for discharging individual eggs from each of the pockets in a group which has been advanced to that station by said conveyor and a control means for operating each said individual egg discharging means which includes a memory device having triggering means for said egg discharge means settable according to the weight registered on the weighing mechanisms so as to discharge eggs having the same weight characteristics at the proper transfer station.

2. An apparatus as set forth in claim 1 wherein said traveling conveyor comprises a series of connected, spacing egg supporting plate members each having an upwardly opening, pocket forming recess for receiving an egg when the plate member is traversing a path adjacent the weighing area.

3. An apparatus as set forth in claim 1 wherein said traveling conveyor comprises a single line of egg supporting members which are angular in cross section in the direction of travel with the leading portion of each pocket forming member being in the form of a plate having a relatively shallow recess in which an egg is accommodated.

4. An apparatus as set forth in claim 1 wherein said means for driving said conveyor is operative to advance the conveyor intermittently a predetermined distance which is equal to the combined length of the pocket members to which eggs are simultaneously fed by said egg delivering means.

5. An apparatus as set forth in claim 1 wherein said transfer areas each extend along the conveyor a distance substantially equal to the distance along the conveyor occupied by the egg weighing mechanisms.

6. An apparatus as set forth in claim 1 wherein said means for delivering eggs to the weighing mechanisms comprises a supply conveyor having a plurality of transversely aligned egg accommodating pockets for advancing a plurality of eggs in a transverse row to the weighing mechanisms and means for insuring substantially simultaneous delivery of the eggs in a row to the weighing mechanisms.

7. An apparatus as set forth in claim 1 wherein said individual egg weighing mechanisms comprise devices which are operable to produce a variable electrical impulse in a control circuit according to the weight of the egg and which form a part of said control means for operating said egg discharging means.

8. An apparatus as set forth in claim 1 wherein said individual egg weighing mechanisms comprise strain gauge devices for producing a variable electrical impulse in a control circuit according to the weight of the egg which control circuit constitutes a part of said control means for operating said egg discharge means.

9. An apparatus as set forth in claim 1 wherein said means for transferring the eggs from the weighing mechanisms to pockets on the conveyor comprises a paddle wheel arrangement having a radial arms which are rotated in timed relation to the delivery of the eggs and which move the eggs off the weighing mechanisms and onto the conveyor.

10. An apparatus as set forth in claim 1 wherein said means for transferring the eggs from the weighing mechanisms to the conveyor pockets comprises rotatably mounted arm members of paddle-like form which are positioned relative to the weighing mechanisms and rotated in timed relation to the advance of the eggs to the weighing mechanisms so as to engage successive eggs and move the same from the weighing mechanisms to the conveyor pockets and also to restrain the movement of following eggs as they advance onto the weighing mechanisms.

11. An apparatus as set forth in claim 1 wherein said means for discharging eggs from the conveyor pockets at the transfer stations comprises a plurality of fluid operated devices spaced along the side of the conveyor which lift the eggs from the conveyor pockets and force them in a direction laterally of the conveyor.

12. An apparatus as set forth in claim 1 wherein said means for discharging eggs from the conveyor pockets at the transfer stations comprises fluid operated devices spaced according to the spacing of the conveyor pockets and disposed along a side of the conveyor so as to be operable to lift the eggs from the pockets and cause them to move out of the conveyor pockets.

13. An apparatus as set forth in claim 1 wherein said means for discharging eggs from the conveyor pockets at the transfer station comprises means for directing a fluid stream across the top portion of an egg so as to lift the egg out of the pocket and propel it in a path laterally of the conveyor.

14. An apparatus as set forth in claim 1 wherein said means for discharging eggs from the conveyor pockets comprises one or more members in the form of a nozzle positioned for directing a fluid stream across the top portion of an egg sufficient to lift the egg out of the conveyor pocket and move the same laterally of the conveyor path.

15. In a machine for grading shell eggs according to the weight of the eggs, an endless traveling conveyor means for advancing the individual eggs to one of a series of transfer stations at each of which eggs of like weight characterization are discharged for further handling, said conveyor having longitudinally spaced, individual egg receiving pockets, means at each of said transfer stations for discharging eggs laterally from the conveyor pockets which are advanced to that station, one or more egg weighing devices arranged at an egg receiving station along one side of said conveyor, means at said receiving station for delivering successive eggs to individual weighing devices and each said weighing device comprising means for generating an electrical impulse which varies according to the weight of the eggs, means at said receiving station for moving eggs from said weighing devices into the pockets of said conveyor, means including an electrical circuit for controlling the operation of the egg discharging means at said transfer station, which control circuit is actuated according to the electrical impluses delivered by said weighing devices whereby to discharge eggs of the same weight characterization at each of said transfer stations.

16. In a machine as set forth in claim 15 wherein said weighing devices each comprise a strain gauge apparatus.

17. In a machine as set forth in claim 15 wherein said electrical circuit includes a memory device which is actuated by impulses from said weighing devices.

18. In an egg handling machine, an egg conveyor having individual egg supporting pockets, an apparatus for transferring eggs from the conveyor pockets at a transfer area which comprises an air nozzle arranged so as to deliver an air stream across the top portion of an egg which is supported in a conveyor pocket, with sufficient force to lift the egg from the pocket and advance the same in a lateral path.

19. In an egg handling machine having an egg conveyor with relatively shallow egg accommodating pockets, a device for discharging eggs from the conveyor pockets which comprises an air nozzle disposed relative to the path of the conveyor so as to direct a stream of air laterally of said path and across the top portion of an egg seated in a pocket thereon and means for supplying air to the nozzle whereby to exert a force on the egg so as to lift the egg out of the pocket and move it in a lateral path out of one side of the pocket.

20. In an egg handling machine as set forth in claim 19 wherein said device for discharging eggs from the conveyor pockets includes means for varying the pressure of the air discharged by said nozzle so as to control the velocity of said air stream and thereby the movement of the egg as it is lifted out of the pocket and moved laterally of the conveyor.

21. In an egg handling machine having an egg conveyor with relatively shallow egg accommodating pockets, a device for discharging eggs from the conveyor pockets which comprises a series of nozzle spaced according to the spacing of the pockets of the conveyor, each of which is disposed relative to the path of the conveyor so as to direct a stream of air across the top portion of an egg in a pocket thereon so as to lift the egg out of the pocket and move it in a lateral path, and manifold means for supplying air to the nozzles which includes a control means for varying the air pressure so as to control the velocity of the air stream and thereby the movement of the discharged eggs.

22. In an egg handling machine as set forth in claim 19 wherein said device for discharging eggs from the conveyor pockets comprises an air nozzle disposed along one side of the path of the conveyor pockets and means to adjust the pressure of the air delivered to said nozzle thereby enabling the velocity of the discharged egg to be controlled regardless of its size and weight.

23. In an egg handling machine, a mechanism for sorting eggs of varying weight, into groups of predetermined weight ranges, and electronic weighing mechanism providing an electric current impulse output which varies according to the weight of an egg deposited thereon, means for delivering eggs to said weighing mechanism, an endless conveyor means having individual egg accommodating pockets, means for transferring successive eggs from the weighing mechanism to the conveyor pockets, a series of predetermined collecting points spaced along one side of said conveyor means and means at said collecting points which is operative according to the electric current output of said weighing mechanism for forcing the eggs out of the sides of the conveyor pockets.

24. In an egg handling machine, a mechanism for sorting eggs according to their weight which comprises a solid state weighing device capable of producing an electric current impulse which varies according to the weight of the egg placed thereon, an associated conveying means extending along one side of said weighing device and a plurality of collecting points spaced along one side of said conveying means and an electrical control circuit for said conveying means which is operative in response to the current output of the weighing device whereby to convey successive eggs from the weighing device to said collecting points according to the output of the weighing device.

25. In an egg handling machine as set forth in claim 24 wherein said electrical control circuit includes a memory device which is actuated according to the electric current impulse resulting from the weight of an egg on said weighing device.

26. In a machine for sorting articles having the general characteristics of shell egg according to their weight, a solid state weighing mechanism providing an electric current impulse which varies according to the weight of an article deposited thereon, a means for depositing successive articles on said weighing mechanism, traveling conveyor means for advancing the articles from the weighing mechanism to a series of station disposed in spaced relation along one side of the path of advance of said conveyor means, each of said stations being adapted to receive articles of a predetermined weight range, transfer means for moving the articles from the weighing mechanism and guiding them in a lateral path onto said conveyor means, means at each of said stations for selectively discharging articles from said conveyor in a lateral path and a mechanism for controlling the operation of said article discharging means which is responsive to the operation of said weighing mechanism so as to discharge articles at each of said stations which are of the same weight range.

27. In a machine as set forth in claim 26 wherein said individual article weighing mechanism comprises a strain gauge device which is operable to produce a variable electrical impulse in a control circuit according to the weight of the article and which forms a part of said mechanism for controlling the operation of said discharging means.

28. In a machine as set forth in claim 26 wherein said weighing mechanism comprises a strain gauge device for producing a variable electrical impulse according to the weight of the article, and said mechanism for controlling the operation of said article discharging means comprising a circuit having an electrical impulse sensor and a memory device actuated by said sensor.

29. In a machine as set forth in claim 26 wherein said weighing mechanism comprises a device which is operable to produce a variable electrical impulse for actuating a control circuit according to the weight of the article and wherein said mechanism for controlling the operation of said discharging means comprises an impulse responsive control circuit with an electrically operated memory device.

30. In a machine as set forth in claim 26 wherein said mechanism for controlling the operation of said article discharging means comprises an endless traveling carrier, means for driving said carrier in synchronism with said conveying means for advancing the articles, a series of movable switch operating members on said carrier, a series of devices for moving individual switch operating members into switch operating position, a series of switch members spaced along the path of said switch operating members, each of said switch members being connected to a predetermined one of said article discharging means, a series of sensor devices which are actuated according to the electric current impulses generated by said weighing mechanism and each connected to a device for moving a predetermined switch operating member into position for operating one of said switch members whereby said article discharging means is operated to discharge articles according to the weight thereof registered on said weighing mechanism.

31. In a machine as set forth in claim 30 wherein said traveling carrier for said switch operating members comprises a pair of laterally spaced, endless chains having spaced cross bars on which said switch operating members are mounted in spaced relation and wherein said switch members are mounted in predetermined lateral position on a series of cross bars which are mounted in spaced relation along the path of said carrier.

* * * * *

UNITED STATES PATENT OFFICE
CERTIFICATE OF CORRECTION

PATENT NO. : 3,928,184
DATED : December 23, 1975
INVENTOR(S) : Wayne H. Anschutz It is certified that error appears in the above-identified patent and that said Letters Patent are hereby corrected as shown below:

On the first page, after the inventor, should appear the name of the assignee - SEYMOUR FOODS, INC. -

Also on the first page, the name of the Attorney, "Greenwalt" should be -- Greenawalt --

Column 3, line 41, "Wc" should be -- WC --

Column 4, line 27, "properdischarge" should be -- proper discharge --

Column 4, line 58, "40'" should be -- 42' --

Column 12, lines 33 and 34, cancel the second occurrence of "mechanism"

Column 13, line 57, cancel "a"

Column 15, line 23, "nozzle" should be -- nozzles --

Column 16, line 7, "egg" should be -- eggs --

Column 16, line 13, "station" should be -- stations --

Signed and Sealed this fourth Day of May 1976

[SEAL]

Attest:

RUTH C. MASON
*Attesting Officer*

C. MARSHALL DANN
*Commissioner of Patents and Trademarks*